(12) United States Patent
Ruiz Lara et al.

(10) Patent No.: US 12,172,754 B2
(45) Date of Patent: Dec. 24, 2024

(54) LAVATORY DOOR LOCK INDICATOR WITH IMPROVED VISIBILITY

(71) Applicant: B/E Aerospace, Inc., Winston Salem, NC (US)

(72) Inventors: Oscar Ruiz Lara, Kirkland, WA (US); Travis John Vaninetti, Bothell, WA (US); Brent Ellis, Bothell, WA (US); Charles F. Forster, Arlington, WA (US)

(73) Assignee: B/E AEROSPACE, INC., Winston-Salem, NC (US)

( * ) Notice: Subject to any disclaimer, the term of this patent is extended or adjusted under 35 U.S.C. 154(b) by 163 days.

(21) Appl. No.: 17/953,583

(22) Filed: Sep. 27, 2022

(65) Prior Publication Data

US 2024/0101257 A1    Mar. 28, 2024

(51) Int. Cl.
*B64D 11/02* (2006.01)
*E05B 41/00* (2006.01)

(52) U.S. Cl.
CPC .............. *B64D 11/02* (2013.01); *E05B 41/00* (2013.01)

(58) Field of Classification Search
CPC .......... E05B 41/00; E05B 17/00; E05B 17/10; B64D 11/00; B64D 11/02
USPC .......................................................... 70/432
See application file for complete search history.

(56) References Cited

U.S. PATENT DOCUMENTS

| | | | |
|---|---|---|---|
| 3,600,916 A | | 8/1971 | Ruppert |
| 10,920,466 B2 * | | 2/2021 | Long ................ B64C 1/1407 |
| 2015/0240526 A1 | | 8/2015 | Clary et al. |
| 2019/0368226 A1 * | | 12/2019 | Sweeney ................ E05B 15/02 |
| 2020/0032548 A1 * | | 1/2020 | Hawle ................ E05B 47/0047 |
| 2021/0388641 A1 | | 12/2021 | Ashcroft et al. |
| 2022/0003020 A1 | | 1/2022 | Clifford |

FOREIGN PATENT DOCUMENTS

| | | | | |
|---|---|---|---|---|
| CA | 2754849 | | | 7/2012 |
| JP | 2002155649 | | | 5/2002 |
| JP | 2002155649 | A | * | 5/2002 |
| KR | 20110060463 | | | 6/2011 |

OTHER PUBLICATIONS

JP-2002155649-A, Izumitani et al. (Year: 2002).*
European Patent Office, European Search Report dated Jan. 11, 2024 in Application No. 23198509.4.

* cited by examiner

*Primary Examiner* — Nathan Cumar
(74) *Attorney, Agent, or Firm* — SNELL & WILMER L.L.P.

(57) ABSTRACT

A locking assembly of a lavatory door in an aircraft, comprising: a locking mechanism; and an occupancy indicator. The occupancy indicator is configured with a display that enables viewing of a status of the lavatory of availability or is occupancy. The position of the locking mechanism and occupancy indicator has been changed from a higher location on the lavatory door that approximates a line-of-sight from a standing position at the lavatory door to a lower location that approximates the line-of-sight from a seated position at the lavatory door. The display of the occupancy indicator is configured with a plurality of display angles to display the status comprising at least a first display angle to allow viewing from the line-of-sight in the standing position and at a second display angle to allow viewing from the line-of-sight in a seated lower position at the lavatory door.

17 Claims, 13 Drawing Sheets

LAVATORY DOOR LOCK INDICATOR WITH IMPROVED VISIBILITY

FIELD

The present disclosure relates generally to lock indicators and, more particularly, to lock indicator assemblies in an aircraft lavatory door.

BACKGROUND

Recently, the Department of Transportation (DOT) issued a Notice of Proposed Rulemaking (NPRM) "Accessible Lavatories on Single-Aisle Aircraft: Part 2" to require airlines to ensure that at least one lavatory on new single-aisle aircraft with 125 or more passenger seats is large enough to permit a passenger with a disability (helped by an assistant, if necessary) to approach, enter, and maneuver within the aircraft lavatory to use lavatory facilities and leave with the aircraft's on-board wheelchair. Passengers with reduced mobility (PRM) require special attention such as lowering the height of the lavatory door lock (and lock indicator) from about 56 inches above the floor to 48 inches above the floor to address dual needs of PRM access and visibility. The lock indicator at a lower level can be less visible to the general adult population.

SUMMARY

In various embodiments, a locking assembly of a lavatory door in an aircraft comprising: a locking mechanism; and an occupancy indicator; wherein the occupancy indicator is configured with a display that enables viewing of a status of a lavatory of whether the lavatory is available or is occupied; wherein a position of the locking mechanism and the occupancy indicator is at a line-of-sight from a seated position at the lavatory door, and enables the locking mechanism to be accessible for access to the lavatory at a seated lower position at the lavatory door; and wherein the display of the occupancy indicator is configured with a plurality of display angles to display the status comprising at least a first display angle to allow viewing from the line-of-sight in a standing position at the lavatory door and at a second display angle to allow viewing from the line-of-sight in the seated lower position at the lavatory door.

In various embodiments, the locking assembly of the lavatory door in the aircraft, further includes an opening in the lavatory door configured at a lower location to display an icon of the status of the lavatory by the occupancy indicator wherein the opening is configured with an upward angled face to enable viewing downward of a status icon of the lavatory in the standing position at the lavatory door.

In various embodiments, the locking assembly of the lavatory door in the aircraft, further includes a shaft in the opening attached to the display with the upward angled face that enables a shifting of the display from a first position to a second position that corresponds with a change of the display of the status icon from an unlocked icon to a locked icon.

In various embodiments, the locking assembly of the lavatory door in the aircraft, further includes a rotating lock indicator linked to the shaft with a frontal face for viewing the status icon in the seated position at the lavatory door and a side upward face for viewing the status icon in the standing position at the lavatory door.

In various embodiments, the rotating lock indicator is configured in to the first position in response to a rotation operation of the locking mechanism to display the unlocked icon and configured in the second position from the rotation operation to display the locked icon.

In various embodiments, the locking assembly of the lavatory door in the aircraft, further includes a dual indicator is configured in the opening of the lavatory door with a dual face comprising a first face that is front facing at a side angle for viewing the status icon in the seated position at the lavatory door and a second face that is upward facing at an upward angle for viewing the status icon in the standing position at the lavatory door.

In various embodiments, the dual indicator is configured to respond to an operation of the locking mechanism to change simultaneous the status icon displayed in the first face and in the second face to correspond to engaging and disengaging the locking mechanism.

In various embodiments, the locking assembly of the lavatory door in the aircraft, further includes a horizontal indicator in the opening configured to display the status icon wherein the horizontal indicator is configured with a horizontal face for viewing from above in the standing position at the lavatory door.

In various embodiments, the horizontal indicator is configured to respond to operation of the locking mechanism to move horizontally to the first position and to the second position and to change the status icon displayed in the horizontal face to correspond to engaging and disengaging the locking mechanism.

In various embodiments, the locking assembly of the lavatory door in the aircraft, further includes a prism shaped cover that is attached over the opening of the display of the status icon to refract light sideways from the display of the status icon that enhances visibility of the status icon when viewed from above in the standing position at the lavatory door.

In various embodiments, the prism shaped cover is configured to enhance visibility of the status icon when viewed from at least one side of the lavatory door.

In various embodiments, an aircraft lavatory door structure is disclosed. The aircraft lavatory door structure includes a locking mechanism; and an occupancy indicator coupled to the locking mechanism to display a status icon of whether a lavatory is available or is occupied; wherein the locking mechanism and the occupancy indicator has been lowered from a height on a lavatory door that approximates a line-of-sight of a passenger in a standing position at the lavatory door to a lower height that approximates the line-of-sight of the passenger in a seated position at the lavatory door wherein the locking mechanism at the lower height is accessible by the passenger in the seated position at the lavatory door to access the lavatory; wherein the occupancy indicator is configured with a display that enables convenient viewing of the status icon by the passenger at the lavatory door and the seated position at the lavatory door.

In various embodiments, the aircraft lavatory door structure further includes: an opening in the lavatory door configured at the lower height to display the status icon by the occupancy indicator wherein the opening is configured with an upward angled face to view the status icon by the passenger in the standing position at the lavatory door.

In various embodiments, the aircraft lavatory door structure further includes: a shaft in the opening attached to the display with the upward angled face to toggle the display of the status icon between an unlocked icon and a locked icon.

In various embodiments, the aircraft lavatory door structure further includes: a rotating lock indicator linked to the shaft with a frontal face for viewing the status icon in the seated position at the lavatory door and a side upward face for viewing the status icon in the standing position at the lavatory door.

In various embodiments, the aircraft lavatory door structure further includes: a dual indicator linked to the shaft and configured in the opening of the lavatory door comprising a first face that is front facing for viewing the status icon in the seated position at the lavatory door and a second face that is upward facing for viewing the status icon in the standing position at the lavatory door.

In various embodiments, the aircraft lavatory door structure further includes: a horizontal indicator in the opening configured to display the status icon wherein the horizontal indicator is configured with a horizontal face for viewing from above in the standing position at the lavatory door.

In various embodiments, the horizontal indicator is configured to respond to operation of the locking mechanism to move horizontally to a first position and to a second position and to change the status icon displayed in the horizontal face to correspond to engaging and disengaging the locking mechanism.

In various embodiments, the aircraft lavatory door structure further includes: a prism shaped cover that is attached over an opening of the display of the status icon to refract light sideways from the display of the status icon that enhances visibility of the status icon when viewed from above in the standing position at the lavatory door.

In various embodiments, a method of assembling a lavatory indicator device is disclosed. The method includes lowering a locking mechanism and an occupancy indicator disposed in the lavatory indicator device from a height on a lavatory door that approximates a line-of-sight in a standing position at the lavatory door to a lower height that approximates the line-of-sight in a seated position at the lavatory door wherein the locking mechanism at the lower height is accessible in the seated position at the lavatory door to access a lavatory; and attaching a display to the occupancy indicator with a plurality of views for viewing of the status icon in both the standing position and the seated position at the lavatory door.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The accompanying drawings illustrate various embodiments employing the principles described herein and are a part of the specification. The illustrated embodiments are meant for description and not to limit the scope of the claims.

DETAILED DESCRIPTION

Figure 1:
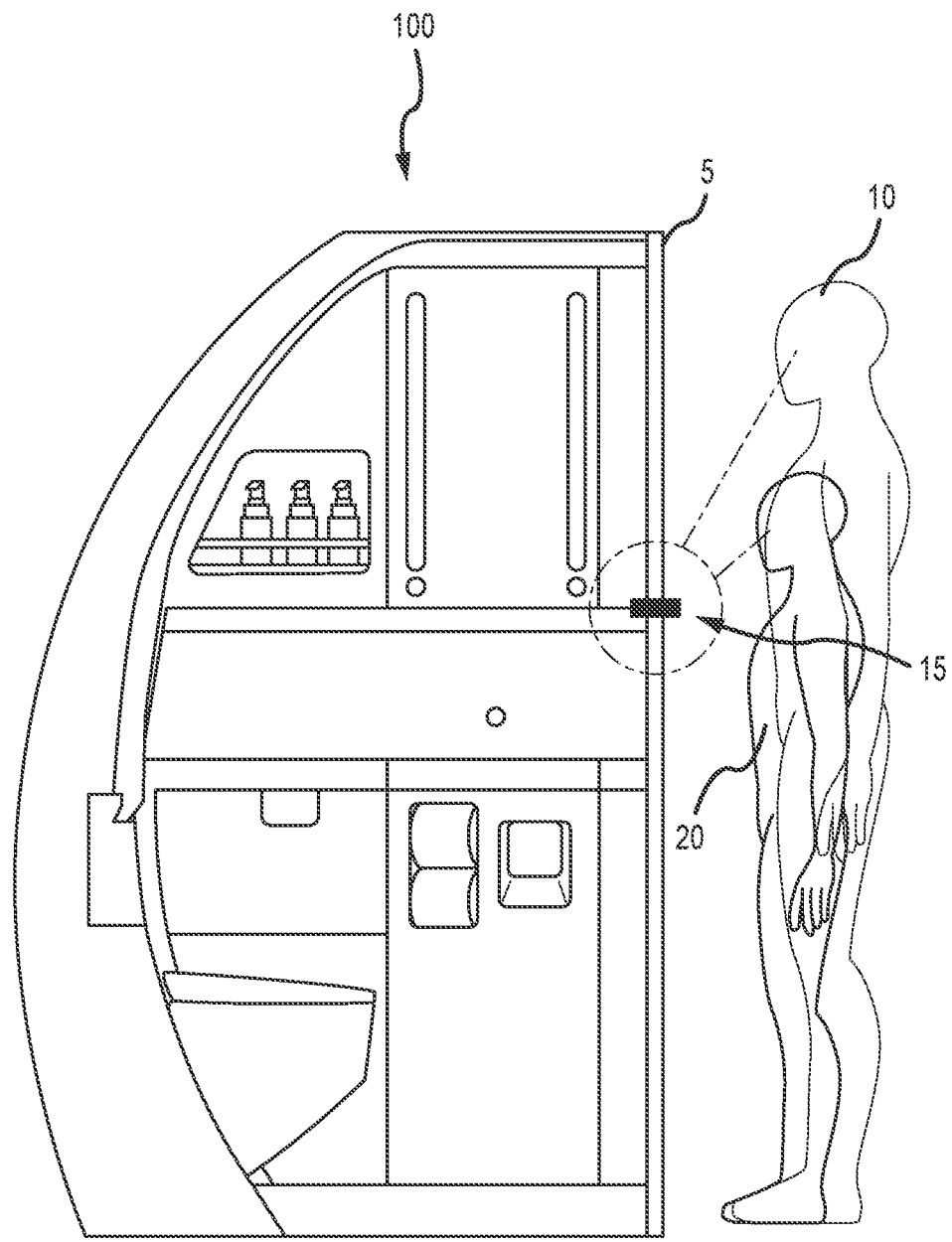
FIG. 1 illustrates a change in viewpoint of a lock indicator and lock of a lavatory from a higher to a lower position in the lavatory door in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Lavatory door locks and occupancy indicators have specific and conflicting needs from use by occupants that are able to move with mobility and without or limited mobility in an aircraft environment. The lavatory door lock and occupancy indicator should be elevated to a sufficient height position in the lavatory door to be viewable by a passenger standing/approaching the lavatory in the aircraft environment. The occupancy indicator is positioned at a high enough level to be readily viewable or seen directly by the passenger as the passenger approaches the lavatory door. For example, the occupancy indicator for convenience is generally placed at a high enough level to be in a range of a direct or close to a direct line of sight of a passenger standing outside the lavatory door so the passenger is not tempted to touch the door and then look-down at lock indicator or even worse is tempted to unlock the door rather than look-down at the door indicator. In either case, the result is to avoid disturbances caused by the passenger attempting to determine whether the lavatory is unoccupied such as touching, knocking, or fiddling with the door lock/handle that can end up disturbing and annoying the occupant if the lavatory is occupied.

Lavatory door locks and occupancy indicators have specific, conflicting needs to address. The locks and indicators need to be high enough in the door to be seen by a passenger standing outside of the lavatory, but also need to be low enough that a passenger with a short reach, particularly when in a wheelchair, can reach and operate them. The ideal spot for these two functions is at two locations and does not overlap; the indicator is placed at a height ideal for visibility, but the result is it will not be easy to operate. The lavatory occupancy indicator needs to be high enough in the door to be seen by a passenger standing outside of the lavatory, but also needs to be low enough that a passenger with a short reach, particularly when in a wheelchair, can reach and operate them.

To overcome this conflict, the door locking mechanism is located at a height that accessible to any passenger, while having an occupancy indicator that is visible for a passenger standing close to the door. In various embodiments, the indicator is configured with a face that is angled to make it easier to view from above or have additional secondary indicators configured that are angled face up for viewing from above.

In various embodiments, the indicator can be configured with a prism cover that refracts light in a manner that allows a passenger to view the indicator even if it is not facing the passenger.

Referring to FIG. 1, FIG. 1 illustrates a change in viewpoint of a lock indicator and lock of a lavatory from a higher to a lower position in the lavatory door in accordance with various embodiments. In FIG. 1, the lavatory 100 with a lavatory door 5 has a door lock and door lock indicator (i.e., locking assembly) 15 configured at a lower location closer to a mid-point of the lavatory door 4. In various embodiments, the door lock and door lock indicator 15 is lowered from a higher location on the lavatory door 5 approximately 58 inches in height from the floor of the cabin were it was in a direct line of sight or viewpoint of a passenger in an upright or standing position (i.e., $95^{th}$ percent of the standing passengers), and lowered to a height of approximately 48 inches not in a direct line of sight or viewpoint of an individual in a standing position but is more within a range of a direct line of sight (or viewpoint) of a seated individual or individual in a seated position.

In various embodiments, the door lock indicator 15 (i.e., the occupancy indicator) has been changed from a higher location on the lavatory door 5 that approximates a line-of-sight 10 from a standing position at the lavatory door to a lower location in the lavatory door that approximates the line-of-sight 20 from a seated position (or shorter person or child) at the lavatory door, and enables the locking mechanism to be accessible for access to the lavatory at a seated lower position at the lavatory door 5.

In various embodiments, when the door lock indicator 15 is lowered to be with a reachable distance for PRM seated in a wheelchair, the door lock indicator 15 is not in direct eyesight of most adult passengers and requires looking down to view the indicator.

Figure 2A:
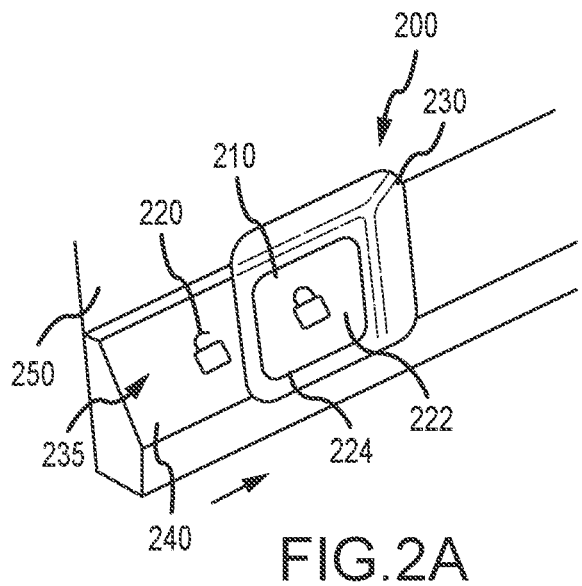
FIGS. 2A, 2B and 2C illustrate a set of diagrams of views of an angled lock display in accordance with various embodiments.
Figure 2B:
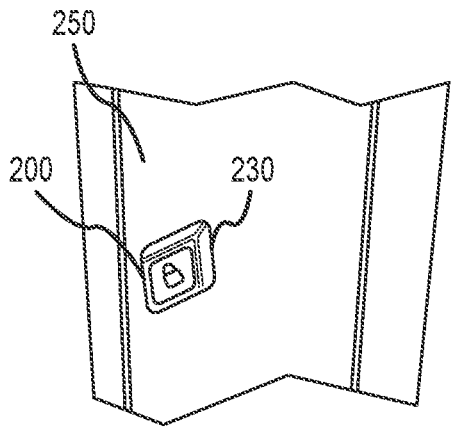
Figure 2C:
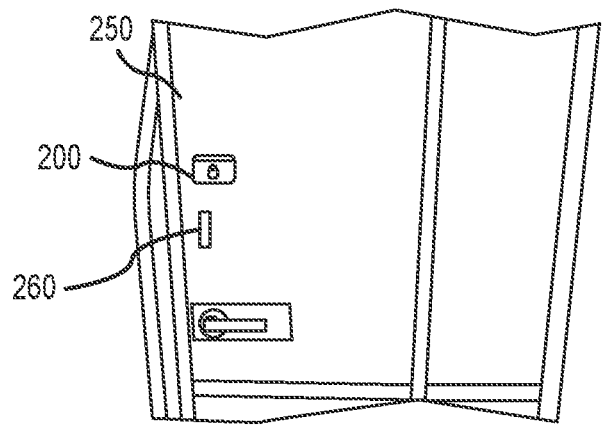

With reference now to FIGS. 2A, 2B and 2C, FIGS. 2A, 2B and 2C illustrate a set of diagrams of views of an angled lock display in accordance with various embodiments. In FIG. 2A, there is shown an angled lock display 200 that includes a display 210 configured in door opening 230 of the lavatory door 250 where the door lock status is displayed as a status by the icon 220 through the door opening 230 in the door. When the door lock is engaged, the door opening 230 shows a locked icon 222, and when the door lock is disengaged, the shaft 235 moves to show an unlocked icon 220 through the opening. The lock status icons are located in a face 224 that is facing upwards (i.e., where upward or angled upward is at an angle between a range of about 15-70 degrees to from a perpendicular to the door for viewing from above) to improve visibility from a standing position. FIG. 2B illustrates a view of the angled lock display 200 in a door opening 230 of the lavatory door 250.

In various embodiments, the angled lock display 200 is configured with the display 210 as an occupancy indicator that enables viewing of a status of the lavatory of whether the lavatory is available or is occupied. The position of the locking mechanism 260 of FIG. 2C and the angled lock display 200 for the occupancy indicator has been changed from a higher location on the lavatory door 250 that approximates a line-of-sight 10 (of FIG. 1) from a standing position at the lavatory door to a lower location in the lavatory door that approximates the line-of-sight 20 (of FIG. 1) from a seated position at the lavatory door also allows for the locking mechanism 260 of FIG. 2C to be accessible for access to the lavatory at a seated lower position at the lavatory door.

In various embodiments, in FIG. 2B, the display 210 of the angled lock display 200 (i.e., the occupancy indicator) is configured with a plurality of display angles to display the status in multiple display angles to allow viewing from the line-of-sight in the standing height position at the lavatory door and to allow viewing from the line-of-sight in the seated lower height position at the lavatory door.

Figure 3A:
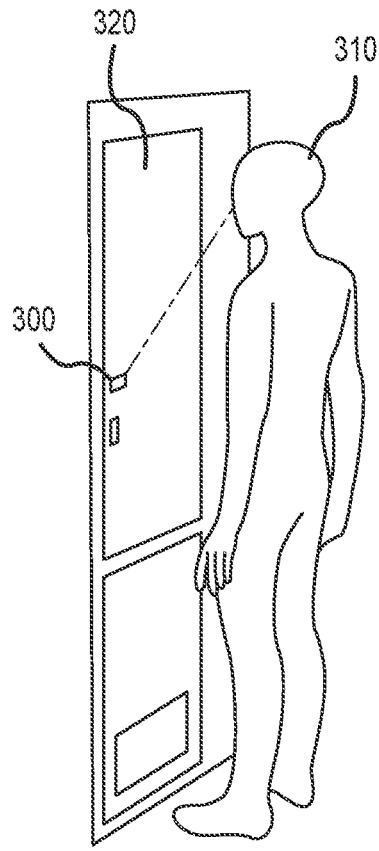
FIGS. 3A and 3B illustrate a diagram of the angled lock display to allow viewing of the status of the lavatory in a standing position in accordance with various embodiments.
Figure 3B:
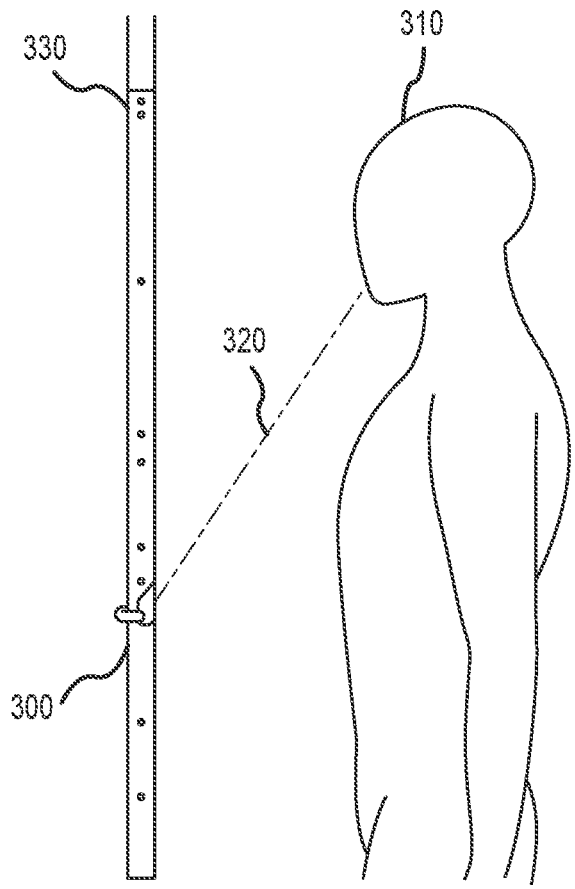

FIGS. 3A and 3B illustrate a diagram of the angled lock display to allow viewing of the status of the lavatory in a standing position in accordance with various embodiments. In various embodiments, FIG. 3A illustrates an angled lock display 300 that shows a 95th percentile in height passenger in a standing position 310 can view the lock status indicator by tilting his head down with a line of sight 320, without needing to crouch. In various embodiments, the angled lock display allows for improved visibility as the passenger's height decreases. FIG. 3B illustrates the angled lock display 300 for viewing by a passenger or occupant to the lavatory in a standing position 310 when the passenger is close to the lavatory door 330. When the passenger approaches the lavatory door 330 the passenger is able to look downward with ease and with little effort to view the status by the angled lock display of whether the lavatory is occupied or available.

Figure 4:
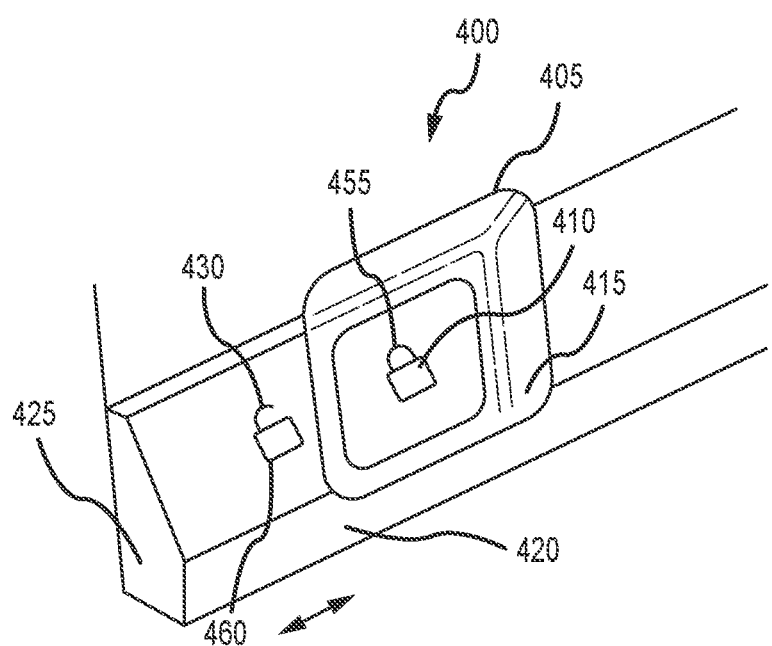
FIG. 4 illustrates a diagram of the angled lock display in accordance with various embodiments.

FIG. 4 illustrates a diagram of the angled lock display in accordance with various embodiments. FIG. 4 shows the angled lock display 400 with a display of an icon window 405, a door occupancy indicator 410, a door panel 415, and door lock 420. The icons are positioned face up 430 for improved visibility for viewing both in the standing and the seated positions, and the door lock (shaft) 425 moves forward and aft (back and forth) that enables a manual shifting of the display from a first position to a second position that corresponds with a change of the display of the status icon from an unlocked icon 460 to a locked icon 455.

Figure 5A:
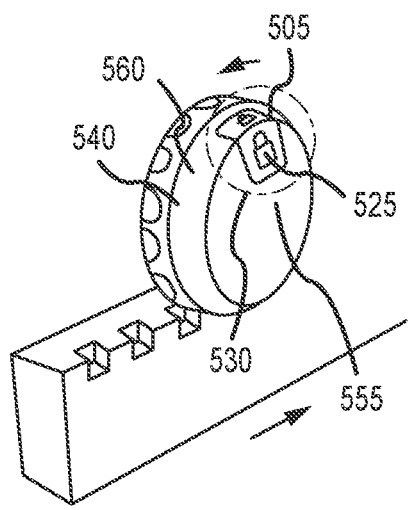
FIGS. 5A, 5B and 5C illustrates diagrams of views of the rotating lock indicator of the lavatory door in accordance with various embodiments.
Figure 5B:
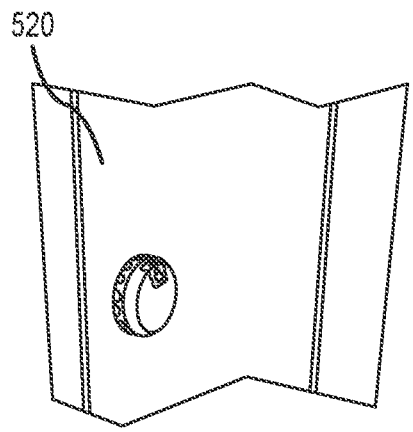
Figure 5C:
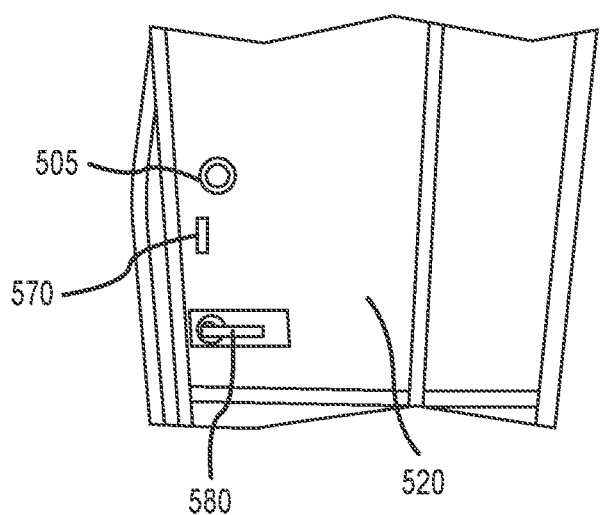

FIGS. 5A, 5B and 5C illustrates diagrams of views of the rotating lock indicator of the lavatory door in accordance with various embodiments. In FIGS. 5A-C, the door lock status 505 is shown through an opening in a rotating dial feature 500 protruding from the lavatory door 520. When the door lock is engaged, the opening 530 shows a locked icon 525. When the door lock is disengaged, a disk 540 rotates to show an unlocked icon through the opening. The disk 540 linked to the door lock shaft in a way that allows the disk 540 of the rotating dial feature 500 to rotate when the shaft is moved fore or aft. The lock status icons are located in a front face 555 that is facing the front and in an upward face 560 facing upwards to ensure they can be visible to any passenger. FIG. 5B shows a perspective view of the rotating indicator (i.e., the rotating dial feature 500) at the lower height on the lavatory door 520. FIG. 5C shows a perspective of the rotating dial feature 500 (the rotating indicator) positioned above the locking mechanism 570 and the door handle 580 on the lavatory door 520.

Figure 6A:
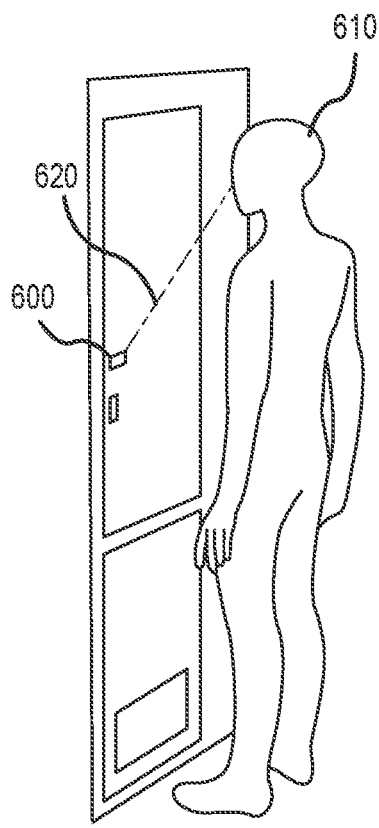
FIGS. 6A and 6B illustrate a diagram of the rotating indicator to allow viewing of the status of the lavatory in a standing position in accordance with various embodiments.
Figure 6B:
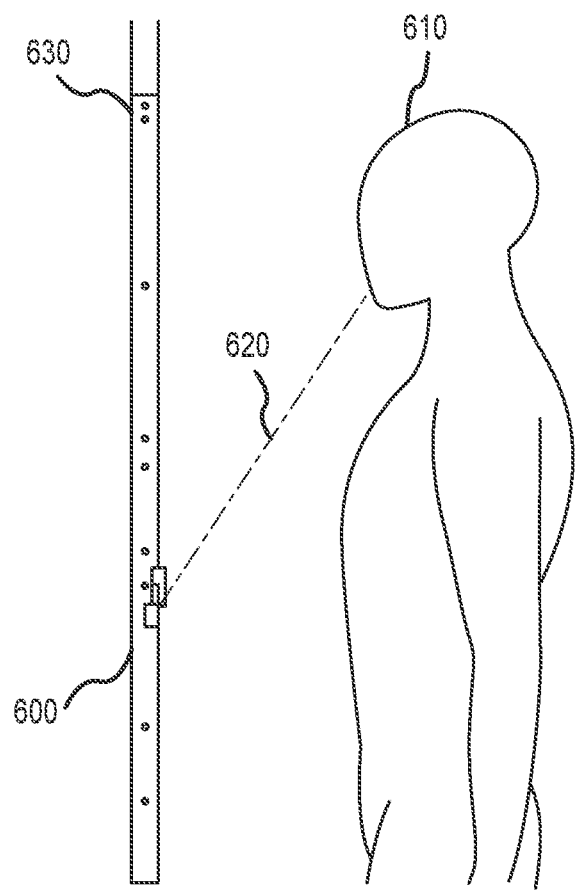

FIGS. 6A and 6B illustrate a diagram of the rotating indicator to allow viewing of the status of the lavatory in a standing position in accordance with various embodiments. In various embodiments, FIG. 6A illustrates a rotating indicator 600 that shows a 95th percentile in height passenger in a standing position 610 is able to view the lock status indicator by tilting his head down with a line of sight 620, without needing to crouch. In various embodiments, the rotating indicator 600 in allows for improved visibility as the passenger's height decreases and for a child to view the door lock indicator that is configured in a vertical face (i.e., another side of the rotating indicator 600). FIG. 6B illustrates the rotating indicator 600 for viewing by a passenger or occupant to the lavatory in a standing position 610 when the passenger is close to the lavatory door 630. When the passenger approaches the lavatory door 630 the passenger can look downward (i.e., at a downward angle (or tilting of a head or eyesight focus at less than a horizontal) in a range from 15 degrees to 70 degrees from a horizontal straight forward line of sight) with ease and without much effort to view the status by the angled lock display of whether the lavatory is occupied or available.

Figure 7:
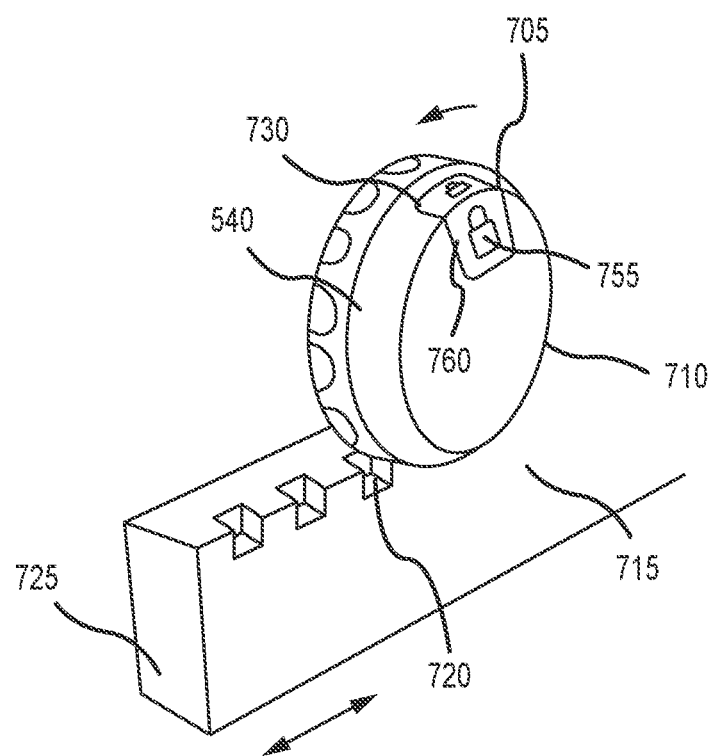
FIG. 7 illustrates a diagram of the rotating indicator in accordance with various embodiments.

FIG. 7 illustrates a diagram of the rotating indicator in accordance with various embodiments. FIG. 7 shows the rotating indicator 700 with a display of an icon window 705, a door occupancy indicator 710, a door panel 715, and door lock 720. The icons are positioned face up 730 for improved visibility for viewing both in the standing and the seated positions, and the door lock (shaft) 725 moves forward and aft (back and forth) that enables a manual shifting of the display from a first position to a second position that corresponds with a change of the display of the status icon from an unlocked icon to a locked icon 755. The main icon faces sideways 760 for side viewing angles.

Figure 8:
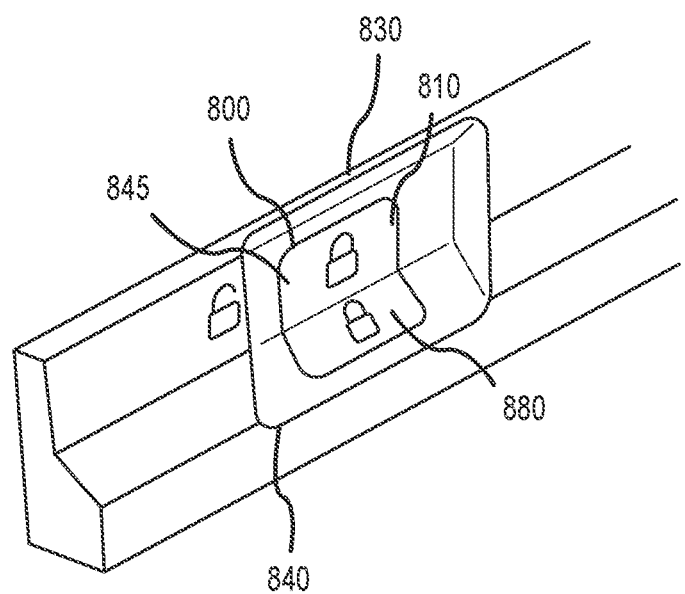
FIG. 8 illustrates a dual indicator display in accordance with various embodiments.

With reference now to FIG. 8, FIG. 8 illustrates a dual indicator display in accordance with various embodiments. In FIG. 8, there is shown a dual indicator display 800 that includes a display 810 configured in a door opening 830 of the lavatory door. The dual indicator is linked in the opening of the lavatory door with a dual face 840 comprising a first face 845 that is front facing at a side angle for viewing the status icon in the seated position at the lavatory door and a second face 850 that is upward facing at an upward angle for viewing the status icon in a standing position at the lavatory door. The dual indicator displays 800 is configured to respond to operation of the locking mechanism to change simultaneous the status icon displayed in the first face 845 and in the second face 850 to correspond to engaging and disengaging the locking mechanism by a movement action of the shaft of the locking mechanism. The shaft movement in the locking mechanism is responsive to a manual action of locking and unlocking the lavatory door.

Figure 9:
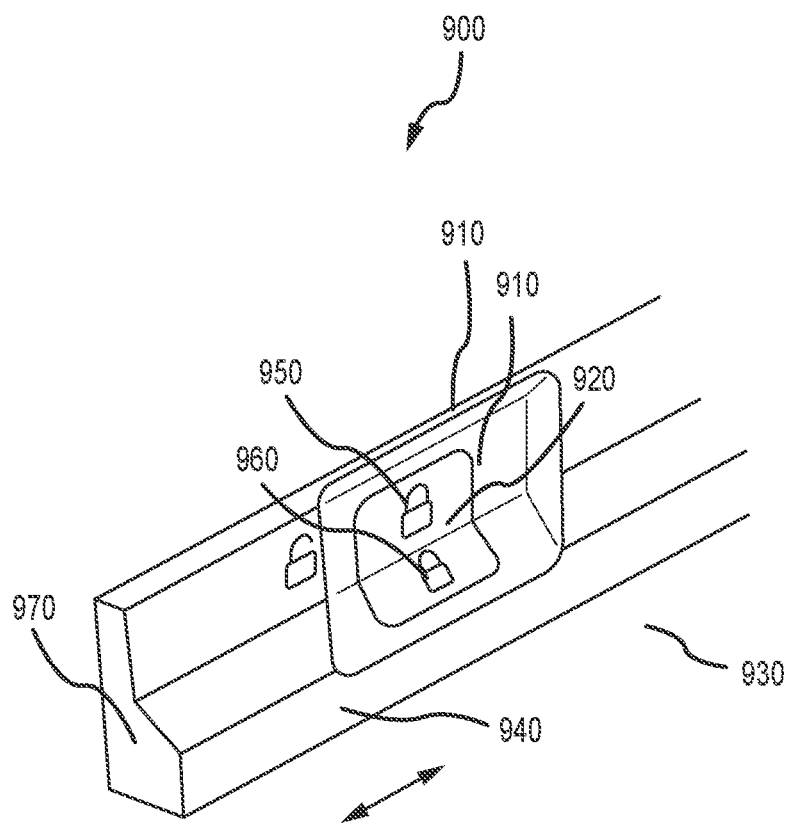
FIG. 9 illustrates a diagram of the dual indicator in accordance with various embodiments.

FIG. 9 illustrates a diagram of the dual indicator in accordance with various embodiments. In FIG. 9, the dual indicator 900 includes a dual face with an icon window 910, a door occupancy indicator 920, and sits in an opening of the door panel 930. The main icon faces sideways 950 for a side viewing angle, the other icon faces up 960 for an improved viewing angle 960 from above, and the door lock 940 moves forward/aft 970.

Figure 10:
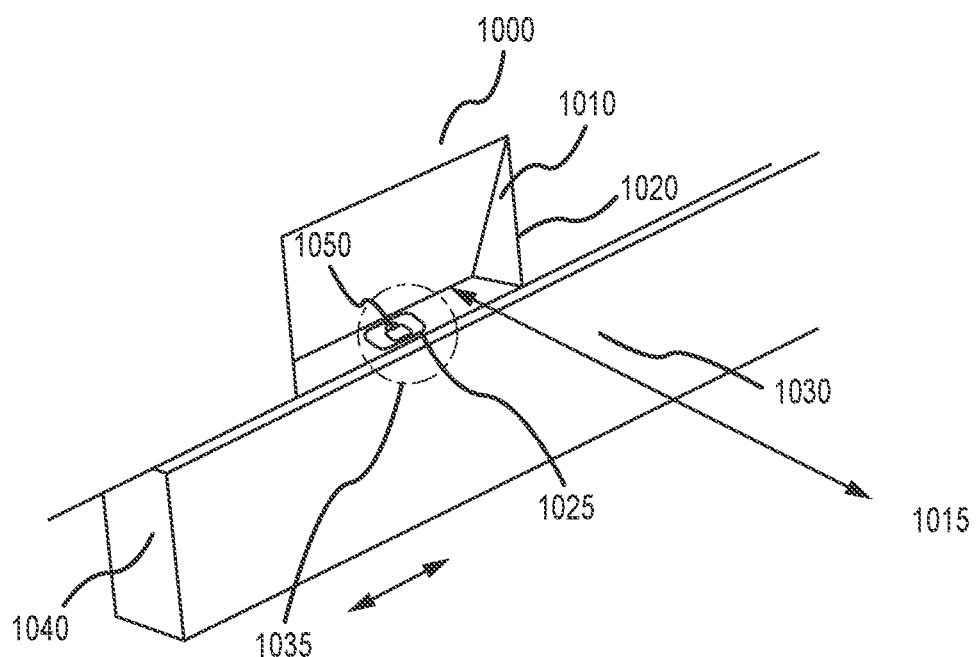
FIG. 10 illustrates a diagram of a horizontal indicator in accordance with various embodiments.

FIG. 10 illustrates a diagram of a horizontal indicator in accordance with various embodiments. In FIG. 10, the horizontal indicator 1000 allows the door lock status shown through an opening 1015 in the door. When the door lock is engaged, the opening 1015 shows a locked icon 1025. When the door lock is disengaged, the shaft moves to show an unlocked icon through the opening. The lock status icons are in a horizontal face 1035 of the door lock 1030 and can be seen from above by a passenger standing in front of the door. The horizontal indicator 1000 is configured to respond to manual operation of the locking mechanism to move horizontally to the first position and to the second position and to change the status icon displayed in the horizontal face to correspond to engaging and disengaging the locking mechanism. In FIG. 10, there is also shown, the icon window 1010, the door occupancy indicator 1020 and the icons that are top facing 1050 for ease of visibility from above. The door lock 1030 moves forward/aft 1040.

Figure 11:
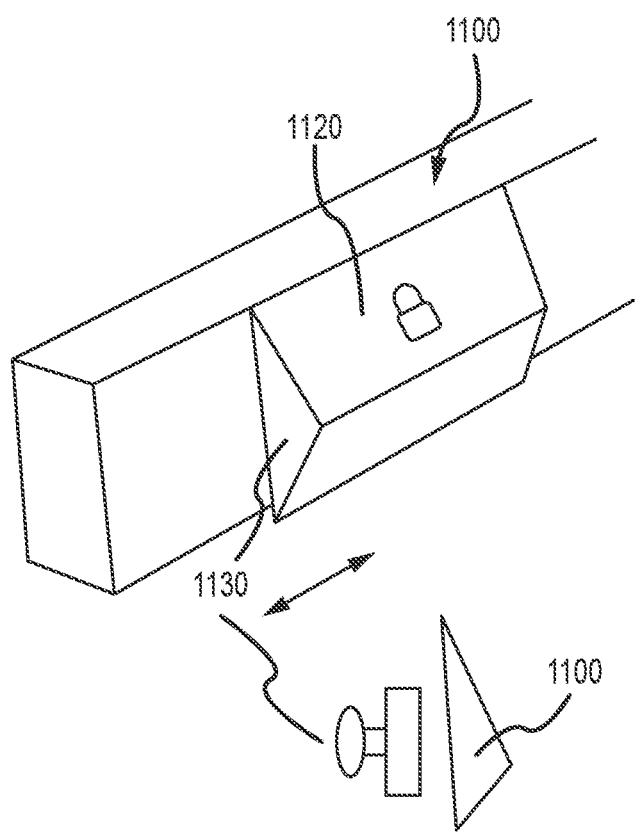
FIG. 11 illustrates a diagram of a prism indicator on the lavatory door in accordance with various embodiments.

FIG. 11 illustrates a diagram of a prism indicator on the lavatory door in accordance with various embodiments. In FIG. 11, the prism indicator 1100 is located outside of the door and refracts light to make it easier for the lock status to be viewed. In various embodiments, the prism indicator 1100 is configured with a prism shaped cover 1120 located in the outside of the door that refracts light in a way that makes it easier for the lock status to be seen from above. The sides 1130 of the prism refract light sideways and allow enhanced visibility from the side by a passenger walking through the aisle.

Figure 12:
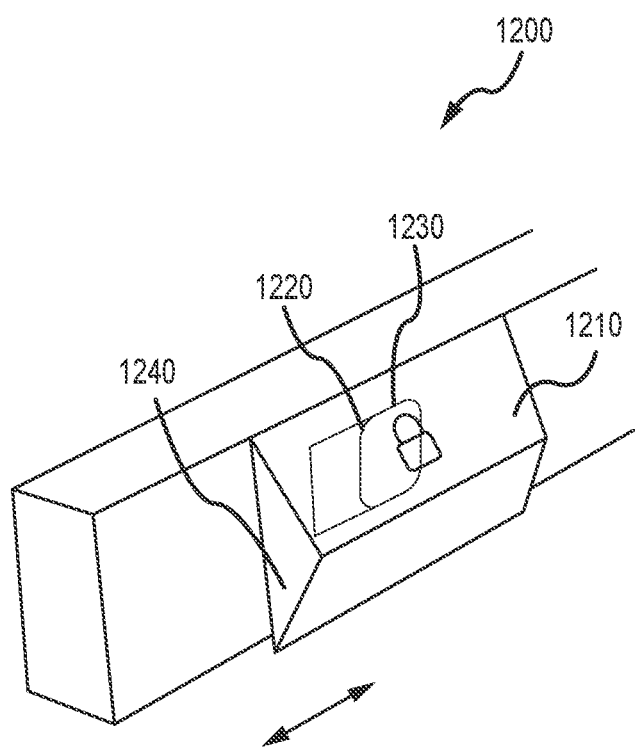
FIG. 12 illustrates a diagram of a colored prism indicator on the lavatory door in accordance with various embodiments.

FIG. 12 illustrates a diagram of a colored prism indicator on the lavatory door in accordance with various embodiments. In FIG. 12, the prism indicator 1200 is configured with a colored cover 1210 that because the color of each door icon has a different background 1220, the different background color is refracted and more visible when viewed through the colored cover 1210. The icons are viewed through the icon window opening 1230 via the colored cover 1210. The color of the visible icon is refracted 1240 along the prism to allow users to know the status from afar. In various embodiments, the prism indicator 1200 refracts light in a manner that allows a passenger to view the indicator even if it is not facing the passenger.

Figure 13:
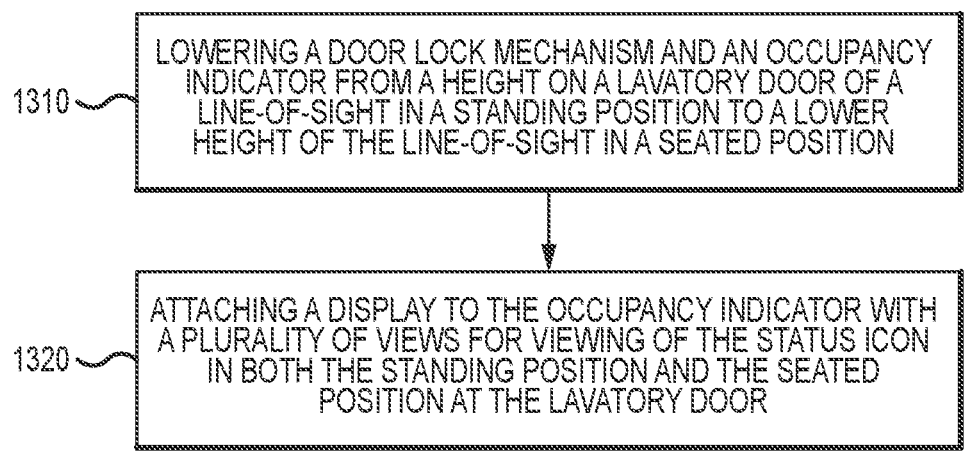
FIG. 13 illustrates a method of making of an occupancy indicator in accordance with various embodiments.

Referring to FIG. 13, a method 1300 of making of an occupancy indicator is illustrated. In accordance with various embodiments, method may comprise at step 1310 lowering a door lock mechanism and an occupancy indicator disposed in the lavatory indicator device from a height on a lavatory door that approximates a line-of-sight in a standing position at the lavatory door to a lower height that approximates the line-of-sight in a seated position at the lavatory door and for enabling the locking mechanism at the lower height to be (manually) accessible in the seated position at the lavatory door to access the lavatory. At step 1320, attaching a display to the occupancy indicator with a plurality of views for viewing of the status icon in both the standing position and the seated position at the lavatory door. The display that can be attached can be configured in different embodiments as described in FIGS. 1-12 that include a rotating lock indicator, a dual indicator, a horizontal indicator, and a prism indicator. In the case of the prism indicator, the prism can be configured with a color or transparent cover.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A locking assembly of a lavatory door in an aircraft, comprising:
    a locking mechanism;
    an occupancy indicator;
    wherein the occupancy indicator is configured with a display that enables viewing of a status of a lavatory of whether the lavatory is available or is occupied;
    wherein a position of the locking mechanism and the occupancy indicator is at a line-of-sight from a seated position at the lavatory door, and enables the locking mechanism to be accessible for access to the lavatory at a seated lower position at the lavatory door,
    wherein the display of the occupancy indicator is configured with a plurality of display angles to display the status comprising at least a first display angle to allow viewing from the line-of-sight in a standing position at the lavatory door and at a second display angle to allow viewing from the line-of-sight in the seated lower position at the lavatory door,
    wherein the display is positioned in an opening in the lavatory door, and
    wherein the display is configured with an upward angled face to enable viewing downward of a status icon of the lavatory in the standing position at the lavatory door; and
    a prism shaped cover that is attached over the opening of the display of the status icon to refract light sideways from the display of the status icon that enhances visibility of the status icon when viewed from above in the standing position at the lavatory door.

2. The locking assembly of the lavatory door in the aircraft of claim 1, further comprising:
    a shaft associated with the display with the upward angled face that enables a shifting of the display from a first position to a second position that corresponds with a change of the display of the status icon from an unlocked icon to a locked icon.

3. The locking assembly of the lavatory door in the aircraft of claim 2, further comprising:
    a rotating lock indicator linked to the shaft with a frontal face for viewing the status icon in the seated position at the lavatory door and a side upward face for viewing the status icon in the standing position at the lavatory door.

4. The locking assembly of the lavatory door in the aircraft of claim 3, wherein the rotating lock indicator is configured in the first position in response to a rotation operation of the locking mechanism to display the unlocked icon and configured in the second position in response to the rotation operation of the locking mechanism to display the locked icon.

5. The locking assembly of the lavatory door in the aircraft of claim 3, further comprising:
   a dual indicator is configured in the opening of the lavatory door with a dual face comprising a first face that is front facing at a side angle for viewing the status icon in the seated position at the lavatory door and a second face that is upward facing at an upward angle for viewing the status icon in the standing position at the lavatory door.

6. The locking assembly of the lavatory door in the aircraft of claim 5, wherein the dual indicator is configured to respond to an operation of the locking mechanism to change simultaneous the status icon displayed in the first face and in the second face to correspond to engaging and disengaging the locking mechanism.

7. The locking assembly of the lavatory door in the aircraft of claim 6, further comprising:
   a horizontal indicator in the opening configured to display the status icon wherein the horizontal indicator is configured with a horizontal face for viewing from above in the standing position at the lavatory door.

8. The locking assembly of the lavatory door in the aircraft of claim 7, wherein the horizontal indicator is configured to respond to operation of the locking mechanism to move horizontally to the first position and to the second position and to change the status icon displayed in the horizontal face to correspond to engaging and disengaging the locking mechanism.

9. The locking assembly of the lavatory door in the aircraft of claim 1, wherein the prism shaped cover is configured to enhance visibility of the status icon when viewed from at least one side of the lavatory door.

10. An aircraft lavatory door structure, comprising:
    a locking mechanism;
    an occupancy indicator coupled to the locking mechanism to display a status icon of whether a lavatory is available or is occupied;
    wherein the locking mechanism and the occupancy indicator is positioned at a height that approximates a line-of-sight of a passenger in a seated position at the lavatory door,
    wherein the locking mechanism at the height is accessible by the passenger in the seated position at the lavatory door to access the lavatory, and
    wherein the occupancy indicator is configured with a display that enables convenient viewing of the status icon by the passenger at the lavatory door and the seated position at the lavatory door; and
    a prism shaped cover that is attached over an opening of the display of the status icon to refract light sideways from the display of the status icon that enhances visibility of the status icon when viewed from above in the standing position at the lavatory door.

11. The aircraft lavatory door structure of claim 10, further comprising:
    an opening in the lavatory door configured at the lower height to display the status icon by the occupancy indicator wherein the opening is configured with an upward angled face to view the status icon by the passenger in the standing position at the lavatory door.

12. The aircraft lavatory door structure of claim 11, further comprising:
    a shaft in the opening attached to the display with the upward angled face to toggle the display of the status icon between an unlocked icon and a locked icon.

13. The aircraft lavatory door structure of claim 12, further comprising:
    a rotating lock indicator linked to the shaft with a frontal face for viewing the status icon in the seated position at the lavatory door and a side upward face for viewing the status icon in the standing position at the lavatory door.

14. The aircraft lavatory door structure of claim 13, further comprising:
    a dual indicator linked to the shaft and configured in the opening of the lavatory door comprising a first face that is front facing for viewing the status icon in the seated position at the lavatory door and a second face that is upward facing for viewing the status icon in the standing position at the lavatory door.

15. The aircraft lavatory door structure of claim 13, further comprising:
    a horizontal indicator in the opening configured to display the status icon wherein the horizontal indicator is configured with a horizontal face for viewing from above in the standing position at the lavatory door.

16. The aircraft lavatory door structure of claim 15, wherein the horizontal indicator is configured to respond to operation of the locking mechanism to move horizontally to a first position and to a second position and to change the status icon displayed in the horizontal face to correspond to engaging and disengaging the locking mechanism.

17. A method of assembling a lavatory indicator device, comprising:
    positioning a locking mechanism and an occupancy indicator disposed in the lavatory indicator device at a height that approximates a line-of-sight in a seated position at the lavatory door, wherein the locking mechanism at the height is accessible in the seated position at the lavatory door to access a lavatory;
    attaching a display to the occupancy indicator with a plurality of views for viewing of the status icon in both the standing position and the seated position at the lavatory door; and
    attaching a prism shaped cover over an opening of the display of the status icon to refract light sideways from the display of the status icon that enhances visibility of the status icon when viewed from above in the standing position at the lavatory door.

* * * * *